July 8, 1952          H. A. CLINE          2,602,850
AIRPORT LIGHTING SYSTEM
Filed May 23, 1946          5 Sheets-Sheet 2
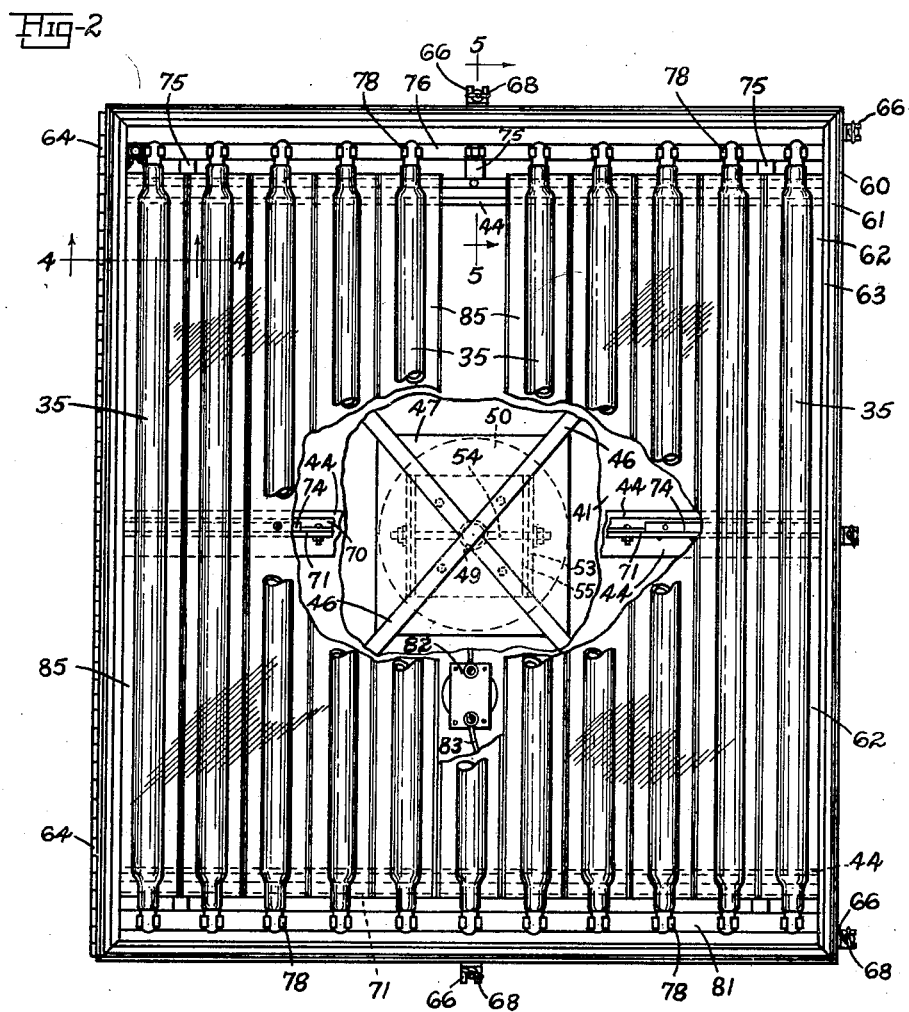
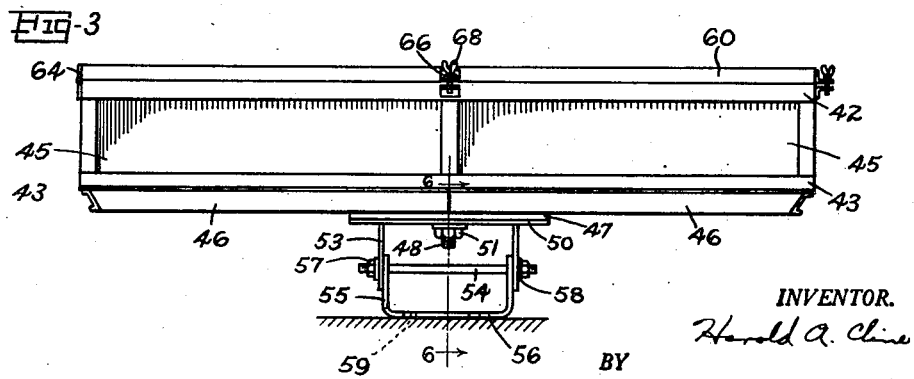
INVENTOR.
Harold A. Cline
BY
Marechal & Biebel
ATTORNEYS July 8, 1952 — H. A. CLINE — 2,602,850
AIRPORT LIGHTING SYSTEM
Filed May 23, 1946 — 5 Sheets-Sheet 3
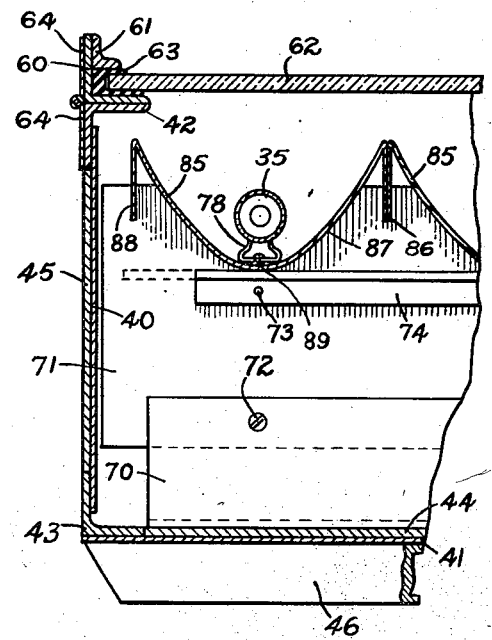
Fig-4
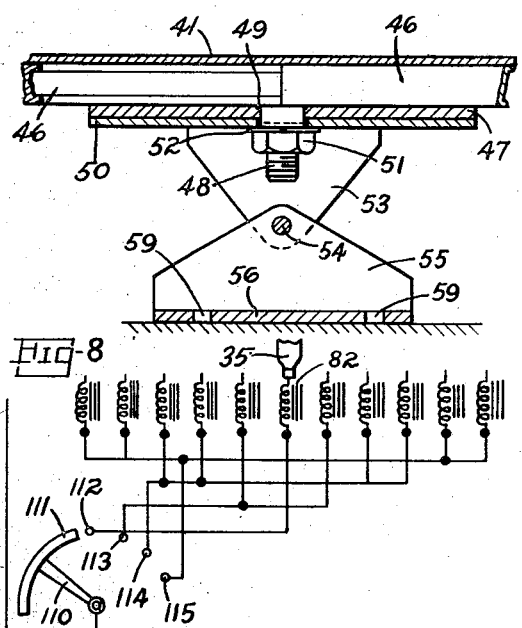
Fig-6
Fig-8
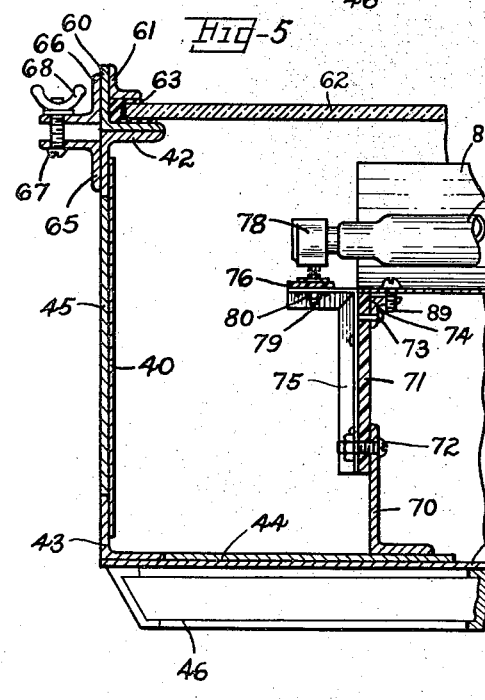
Fig-5
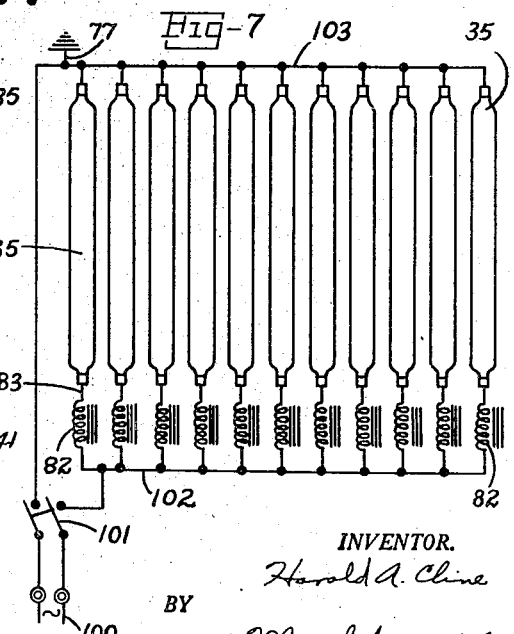
Fig-7
INVENTOR.
Harold A. Cline
BY
Marechal & Biebel
ATTORNEYS

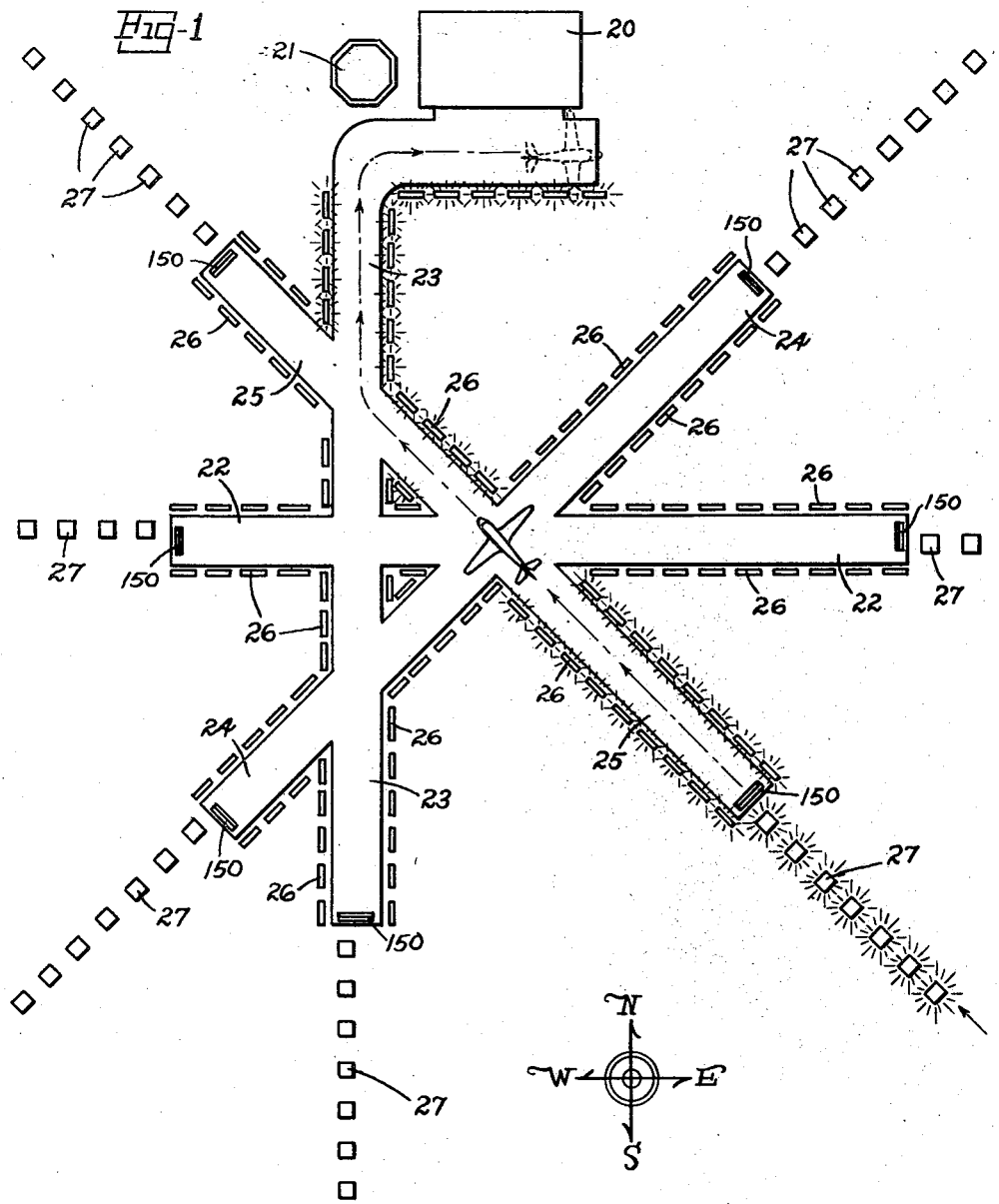

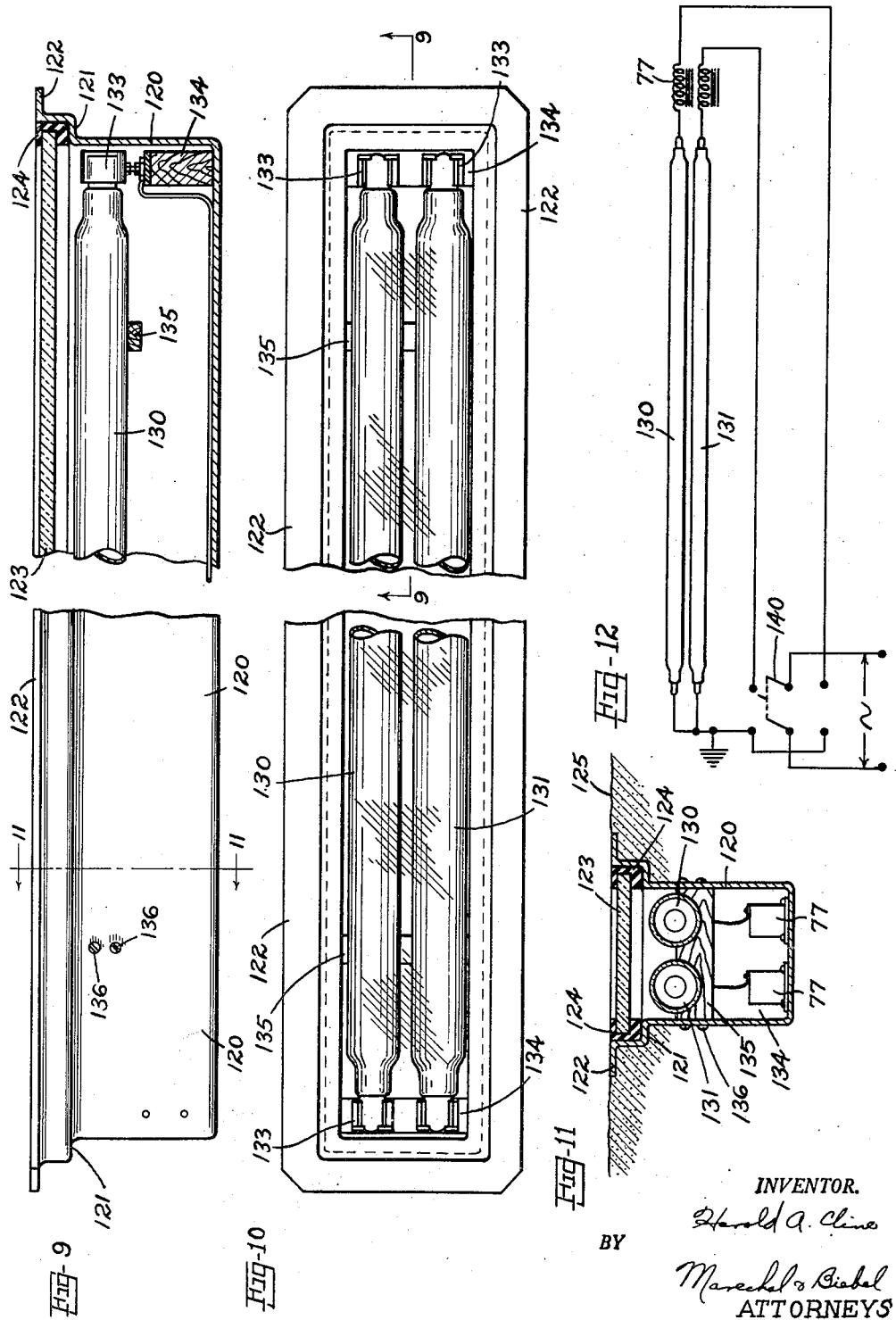

July 8, 1952           H. A. CLINE           2,602,850
AIRPORT LIGHTING SYSTEM
Filed May 23, 1946           5 Sheets-Sheet 5
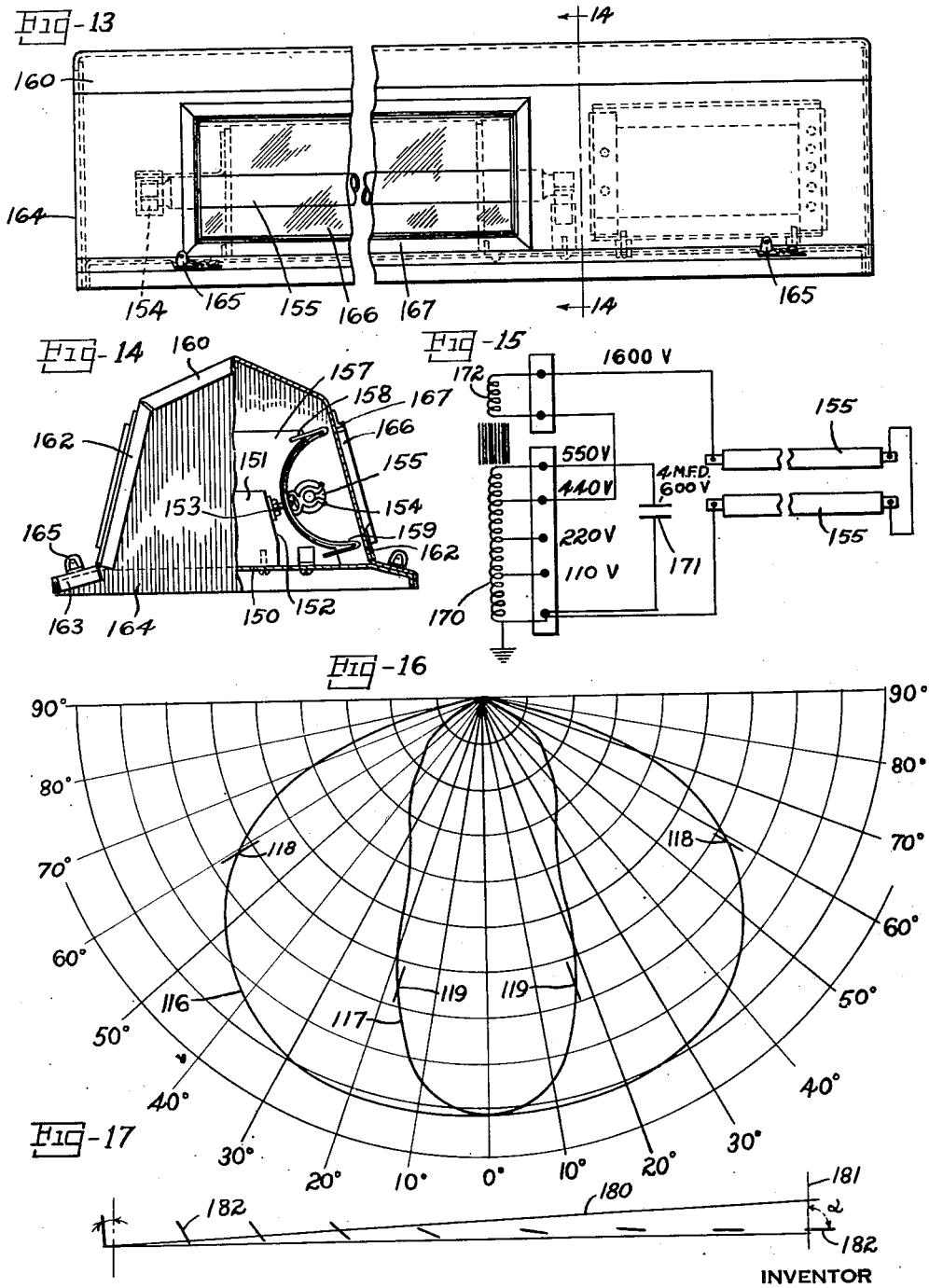
INVENTOR
Harold A. Cline
BY
Marechal & Biebel
ATTORNEYS Patented July 8, 1952

2,602,850

UNITED STATES PATENT OFFICE 2,602,850

AIRPORT LIGHTING SYSTEM

Harold A. Cline, Dayton, Ohio, assignor, by mesne assignments, to Emarco Corporation, Chicago, Ill., a corporation of Illinois Application May 23, 1946, Serial No. 671,696

6 Claims. (Cl. 177—352)

In the operation of aircraft, it is of primary importance to provide a reliable system by means of which the pilot can be assured of making a safe landing of the aircraft, especially under conditions which approach the limiting conditions of visibility and ceiling.

Various blind landing systems are known by the use of which it is possible to land an aircraft without visual contact with the ground, such systems require both special training and special equipment, as well as a high degree of accuracy and reliability in the instrumentation used. An error of only a few feet in the measurement of altitude, for example, can result in landing conditions which vary from merely unpleasant to actually dangerous, both to personnel and to the equipment involved.

The visibility of the landing field can be improved materially, both for daylight flying and particularly for night operations, by the use of properly constructed and arranged lights for outlining the glide path and the actual landing strip. The use of a high intensity beam directed toward the approaching aircraft has not proven to be highly successful and may even create a serious flight hazard. Where visibility is good, the high intensity beam may have a blinding effect which adds to the pilot's difficulties in bringing the aircraft to a proper landing. If directed along the line of flight, the high intensity beam has been found to create an illusion of height, such that the pilot is apt to level the ship for a landing while still well above the ground level. Under adverse weather conditions the usual high intensity beam is found to have low penetrating power and is either absorbed in a relatively short distance, or may appear merely as a blur of light without properly identifying a position or location.

It is accordingly the principal object of this invention to provide a landing field lighting system which develops a large amount of light of such character that it is highly penetrative of fog, mist, and the like, and yet which is not blinding and does not interfere with the continuing vision of the pilot at any stage of the final landing operation.

It is also an object to provide a series of lighting units particularly adapted for identifying the glide path in advance of a landing field, each of the units being in the form of a blanket of substantial area.

It is also an object to provide a lighting system of such character in which the quantity of light developed by each of the individual units may be readily controlled while maintaining substantially uniform light intensity over a substantial area of the light source.

It is also an object to provide an improved airport lighting system which includes selectively operable light sources having definite characteristics as to color and arrangement for identifying the proper runway for landing and other selectively operable light sources located outwardly of the runway and of contrastingly different characteristics as to color or arrangement for indicating the glide path.

It is a further object to provide a lighting unit in the form of a blanket having a substantial area capable of being readily identified and in which the light is distributed over a substantial angle transversely of the normal direction of flight to provide for proper viewing thereof by the pilot notwithstanding his position to one side or the other of the unit.

Other objects and advantages of the invention will be apparent from the following description, the accompanying drawings and the appended claims.

In the drawings, which illustrate a preferred embodiment of the invention—

Fig. 1 is a schematic view illustrating an airport provided with a lighting system in accordance with the present invention;

Fig. 2 is a top plan view of one of the lighting units utilized for defining the approach or glide path in the lighting system of the invention, with the central portion thereof being broken away in a plurality of layers to illustrate internal construction;

Fig. 3 is a view in end elevation of the lighting unit shown in Fig. 2;

Fig. 4 is an enlarged partial section taken substantially on the line 4—4 of Fig. 2;

Fig. 5 is an enlarged partial section taken substantially on the line 5—5 of Fig. 2;

Fig. 6 is an enlarged partial section taken substantially on the line 6—6 of Fig. 3;

Fig. 7 is a wiring diagram for the lighting unit shown in Fig. 2;

Fig. 8 is a diagram of a modified form of control circuit for the unit;

Fig. 9 is a view in side elevation, partly in vertical section substantially on the line 9—9 in Fig. 10, illustrating one of the lighting units utilized along the airport runways in the lighting system of the present invention;

Fig. 10 is a top plan view of the lighting unit illustrated in Fig. 9;

Fig. 11 is a view in vertical section taken substantially on the line 11—11 in Fig. 9;

Fig. 12 is a wiring diagram for the lighting system shown in Figs. 9 to 11;

Fig. 13 is a broken side elevational view of a unit adapted for marking the end of a runway or of the field;

Fig. 14 is a view partially in end elevation and partially in vertical section on line 14—14 of Fig. 13;

Fig. 15 is a wiring diagram of the unit shown in Figs. 13 and 14;

Fig. 16 is a polar diagram of the pattern of light distribution from one of the approach units; and Fig. 17 is a diagram illustrating the manner of arranging the lighting units on the glide path.

The airport illustrated in Fig. 1 is shown as including an administration building 20, a control tower 21 and a plurality of runways arranged to provide for landing under a variety of wind directions, i. e., an east-west runway 22, a north-south runway 23, a north east-south west runway 24, and a north west-south east runway 25. Each of these runways is shown as provided along its outer edges with a plurality of light sources 26 substantially outlining the runway. These light sources are preferably arranged in a definite pattern as to location and color characteristics so that they will be readily identifiable by the pilot and so that he can determine accurately the location of the particular runway on which he is to land. Preferably as indicated these light sources are arranged in a double line located substantially at the outer boundaries of each runway.

A plurality of other light sources 27 are arranged adjacent the outer ends of each runway to designate the glide paths thereto, and these lights are arranged in a contrasting pattern so that the glide path will be clearly marked as separate and distinct from the runway. Preferably the glide path light sources 27 are arranged in a single line which continues in the same direction as the glide path and which may be either colinear with the center of the runway, or as shown, offset toward the left of the runway sufficiently to facilitate the viewing of a series thereof by the pilot, who is usually located at the left of the center of the plane and whose direct forward and downward vision is sometimes hampered by the fuselage of the plane.

Figs. 2 to 7 illustrate a lighting unit found highly satisfactory for use as light sources 27 in the lighting system of this invention. The housing for the lighting unit is shown as a rectangular, boxlike structure formed of side panels 40 of steel, aluminum or other suitable materials and a bottom panel 41 secured together as by welding to a plurality of angles 42 and 43. Three heavier panels 44 are shown as secured in superimposed relation on bottom panel 41 across the middle and each end of the box, and the outside of each of side panels 40 is similarly reinforced by means of panels 45. The bottom of the box is shown as further reinforced by means of channel members 46 arranged to extend diagonally between opposite corners at the bottom of the box and firmly secured as by welding to the bottom panel 41. These channels are in turn welded to a bearing plate 47, which is preferably square and has a stud bolt 48 permanently secured thereto, as by means of the welded joint indicated at 49. This stud bolt 48 is in turn journaled in a supporting plate 50 and secured by means of nut 51 and lock washer 52.

Plate 50 is preferably round and has two bracket arms 53 welded or otherwise rigidly secured thereto and extending perpendicularly downwardly therefrom. Arm members 53 are provided with opposing holes adapted to receive a pin or shaft 54 which is in turn supported in similarly opposing holes in the upwardly extending arm portions 55 of a U-shaped bracket 56 and is provided with threaded ends adapted to receive suitable nuts 57 and lock washers 58. Bracket 56 is adapted for permanent mounting, as by means of bolts or rivets engaging in holes 59 and set in a suitably permanent base such as concrete. In such mounting in a system of the type shown in Fig. 1, bracket 56 will be so positioned that shaft 54 will be substantially transverse to the line of the glide path, so that the entire unit may be tilted in the plane of the glide path to control the direction of projection of the light emanating therefrom and may be locked in the desired angular setting by means of nuts 57 and washers 58. At the same time, bolt 48 and its nut and washer provide for adjustment of the unit on an axis at right angles to shaft 54 and similar locking in adjusted position.

The top for the housing shown in Figs. 2 to 5 is formed of four angle irons 60 having their ends mitered and welded together. A smaller angle 61 is welded or otherwise secured to the inner surface of each angle 60 in such manner as to provide a channel adapted to receive the edges of a glass plate 62, which is securely held within the channel by suitable packing or sealing means 63 such as a rubber gasket or a suitable plastic. The angle 60 along one side of the housing top is shown as secured through hinge 64 to its adjacent angle 42 on the body of the housing, and a plurality of lock elements are also shown as comprising pairs of short, right-angled tabs 65 and 66 welded or otherwise secured to angles 42 and 60 and adapted to be drawn together by means such as bolts 67 and wing nuts and washers 68. When the top of the frame is closed, the inner flanges of angles 42 and 60 are adapted to engage in abutting relation, and the whole may be firmly secured by a suitable fastening such as wing nuts 68. This provides a substantially weather-tight enclosure for the lighting elements themselves while at the same time permitting ready access thereto for servicing, exchanging burned out tubes and the like.

The mounting means for the gaseous discharge tubes 35 is shown in detail in Figs. 3, 4 and 5. As shown, each of bottom panels 44 of the housing has secured thereto as by welding an angle 70 extending across the housing. To each of these angles 70 there is secured a panel 71 of rigid insulating material such for example as Bakelite. Panels 71 are shown as secured to angles 70 by means of bolts and nuts 72, and along the upper edge of each of panels 71 there is secured as by means of rivets 73 a further angle 74. Bolts 72 and rivets 73 also serve to secure to the other side of the two end panels 71 three bracket members 75, shown as composed of a pair of strips of angle iron having their adjacent corners mitered and welded together to form a right angled joint. The brackets 75 along one end of the housing serve to support a strip 76 of copper or other conducting material which serves as a common connection to one end of each of tubes 35, such connection being grounded to the frame as indicated at 77. As shown, these tubes are secured to strip 76 by means of a plurality of clip members 78, each of which is adapted to receive and hold an end of one of said tubes and one of which includes a projecting bolt 79 which extends through strip 76 and is held in electrical contact therewith by means of nut 80.

The construction at the opposite end of the housing from strip 76 is substantially the same with the exception that the corresponding strip 81 is composed of non-conducting material such as Bakelite or the like. A choke coil 82 or equivalent reactor device is connected with the end of each of tubes 35 opposite copper strip 76 by means of a wire 83 leading to the appropriate clip 78 for each of respective tubes. Although Fig. 2 shows only a single coil 82 it will be understood that a similar coil is provided for each of tubes 35.

Each tube is also provided with a reflector 85 formed from aluminum or other suitable material. As shown particularly in Fig. 4 each reflector 85 has the general formation of a trough open at the ends and is curved in the plane perpendicular to its length or axis. Each of reflectors 85 is provided along its side edges with a downwardly depending flange portion 86, and each of Bakelite panels 71 has its upper edge scalloped or similarly cut out at 87 to provide a groove adapted to receive the curved portions of the reflectors and is also provided with a plurality of slots 88 for receiving flanges 86 on reflectors 85. The reflectors 85 are secured in place on angles 74 by means of screws 89. This provides simple and accurate means for properly positioning the reflectors in the frame, and providing for ready removal thereof for cleaning and the like, assuring the replacement thereof in the same accurate relation to the light sources.

In assembling the unit each of the tubes 35 is mounted within its respective reflector and generally parallel with the length thereof, accurate positioning of the tubes being readily obtained by suitable adjustment of clips 78 and their supporting bolt portions 79. Where parabolically curved reflectors are used, the tube may be located substantially at the principal focus of the reflector, thus providing for directing the maximum light intensity in direction substantially normal to the plane of the unit. However the reflector also provides for directing a substantial amount of light through a relatively wide angle transversely of the length of the tubes, such angle being substantially greater than 90° and preferably approaching about 150°. This assures that a pilot approaching the light from one side or the other will be in position to observe clearly and to receive a substantial amount of light therefrom, the pilot thus being readily able to orient himself and establish the proper relationship with regard to the glide path and the runway.

Further, since the tube has substantial axial extent, it provides for directing light over an even greater angle in the direction of the length of the tubes, i. e., in the normal direction of flight of the aircraft thereover. Thus the pilot can readily observe the light source from a remote position and at a relatively flat angle, even though the plane of the unit may be substantially horizontal. With the customary glide path of 2½°, it will be evident that in order properly to view the unit, it is important that the pilot be able to observe the same throughout practically the full range of angles, both longitudinally and transversely of the unit, and with the present construction such desired light distribution is obtained. The pilot thus is provided with a relatively large amount of light in the form of a blanket area of considerable size which makes it readily discernible and identifiable, at the same time assuring that the intensity at any point will not be so great as to be blinding. Thus the maximum intensity in the direct line of focus of the unit is within such value as to preclude a blinding condition, and the pilot can continuously observe the unit as the plane approaches and passes over the same, without objectionable effects or otherwise impairing his perception of vision in completing the landing operation.

The gaseous discharge tubes 35 preferably are of the type containing inert gases such as neon, krypton or the like, and preferably are constructed to carry normal energizing currents substantially in excess of those customary with the neon lights as used in signs, etc. In the latter case a discharge current of the order of .015 to about .060 ampere is commonly used, but it has been found that improved results are obtained with a greater light intensity where this current is increased up to several hundred milliamperes, varying up to ½ an ampere or more. While the increase in the total light developed is not directly proportional to the increase in current, the use of these higher current values has been found to be highly advantageous as providing for a solid column of light of the controlled high but non-blinding intensity. A suitable electrode construction for use in such tubes is shown in Patent No. 2,061,390, the tubes themselves being preferably formed of heat resisting glass such as quartz, Pyrex, lead-glass or the like to provide the desired strength and heat resistance.

The selection of the gas is of substantial importance as providing for the development of light of the proper wave length to have the desired high penetrative power so that it will largely pass through mist or fog without being absorbed. For this purpose the use of neon has been found advantageous, forming a source of red light, which has greater penetrative power than light of shorter wave length. The development of red light at the source is highly desirable in that it provides much greater light efficiency than is possible where a white light source is utilized in conjunction with red filters for removing light of other colors. The light sources preferred herein, therefore, make use of neon gas with or without the use of other gases and are such as to develop initially substantially the greater part of their light energy within the range of above 5800 angstrom units and preferably within the range of 6300 to 6800 angstrom units. Where a light of green color is desired, such for example as for marking the boundaries of the field, or the like, a tube containing mercury vapor and operating in the increased current range above indicated may be employed, providing for development of a high efficiency source of green light. However because of the greater absorption of the shorter wave length of green light by mist or fog, the source of red light is preferred for the approach or glide path identifying units 27 as herein described.

In some cases it has been found desirable to arrange the reflectors so that different tubes of the unit will project the light with a somewhat different distribution pattern. For example, the reflector 85 associated with the central tube or tubes may have the greatest depth and provide the maximum focusing effect normal to the plane of the unit. The reflectors of adjacent tubes located laterally of such central tube may then be of progressively different characteristics providing a wider angle of distribution, with the maximum angle of distribution taking place from the laterally outermost tubes. This arrangement further assures the desired controlled high intensity when the aircraft is in the normal position but provides adequate light throughout the entire range of angles to facilitate observation when the pilot is somewhat off the normal course.

Fig. 7 shows a typical circuit arrangement for the control of the circuits to one of the units. As there shown the power source is indicated at 100, supplying power to a suitable switch 101. One side of the light is connected to a common bus 102 from which connection is made to the reactors 82. The reactors in turn are connected to one end of the tube with which they are associated, the opposite ends of the tubes being connected through a common bus 103 to ground, and also to the opposite side of the switch. The closing of switch 101 will therefore result in the simultaneous energization of all the tubes of the particular unit. Switch 101 may be located in the airport control tower, and may be arranged for operation concurrently with the similar switches of all of the units associated with a particular glide path so that the entire glide path lighting system will be controlled in one operation.

Fig. 8 shows a modified construction in which means are provided for selectively controlling the total quantity of light developed by the unit, while developing substantially the same intensity of light over each unit of area of the source. Such a control may be desirable for example to vary the lgiht output depending upon the weather conditions, a relatively lesser light output sufficing under favorable visibility than when visibility is poor.

For this purpose a control switch 110 is provided which has an elongated sector 111 movable into successive contact with a series of switch points. Point 112 is connected to the central reactor 82 and through it to the central light source 35. When the sector 111 moves into contact with switch point 112 only the central tube will be energized, and will develop light at the same controlled intensity, but since the area producing the light is greatly reduced, it will be evident that the total light developed will also be substantially lower. Where the unit comprises eleven tubes, this condition will result in developing only one eleventh of the total light but the intensity over the lighted area will remain the same. Under good visibility conditions this will give a clearly visible light and adequately enable the pilot to ascertain his position and land the ship safely, with the use of only one tube out of the unit effecting a corresponding saving in power.

Under less favorable visibility conditions sector 111 is moved further to bring it into contact with switch point 113. As shown this provides for the energizing of two additional tubes, giving a total of three such tubes which are energized and a corresponding increase in total light developed.

When moved into contact with switch point 114, additional tubes on each side are energized, giving a total of seven tubes and a corresponding increase in the lighted area and the resulting total light development.

In the final position which would be used for the most adverse weather conditions sector 111 has been moved into contact with switch point 115, so that the entire group of tubes is energized and lighted, thus establishing the maximum light output by increasing the effective lighted area of the unit but maintaining substantially uniform intensity over the lighted area. This provides a light source of large total light capacity, readily visible to the pilot from practically any angle of approach, of controlled non-blinding intensity and of such distinctive characteristics as to color, size and shape, that it is readily identified either as a single unit or when arranged in a series defining the glide path.

A suitable unit has been found to be one having eleven parallel gaseous discharge tubes each having a length of about four feet and so arranged as to form a light source approximately four feet on a side. The light distribution pattern is typically shown in Fig. 16 where the observed light intensities are shown by curve 116 for the plane parallel to the tubes and passing through the center of the assembly and by curve 117 for the plane perpendicular to the tubes and passing through the center of the assembly. As shown, the half power points 118 on curve 116, i. e., the points where the radii are .707 times the maximum radius, define an angle of about 118°, while for curve 117, the half power points 119 define an angle of about 35°. It will thus be evident that the light source will have high visibility over a board range of angles the direction parallel to the tubes, i. e., the normal direction of flight of the aircraft over the unit, and will also have substantial visibility in the plane at right angles thereto so that even if the aircraft is laterally off course, the light will still be readily visible.

Figs. 9 to 12 illustrate a runway lighting unit which has been found suitable for use in the lighting system shown in Fig. 1. In Figs. 9 to 11 the housing for the light is shown as comprising a generally rectangular box 120 formed from suitable sheet metal and provided along its upper edge with a flanged construction which includes an annular shoulder 121 and an outwardly projecting flange portion 122. Shoulder 121 serves to support the edges of the periphery of a glass cover 123, which is secured therein by sealing means 124 such as a rubber gasket or a suitable plastic material. This light unit is equally well adapted for mounting along an airport runway or in the runway itself and flush with the surface thereof indicated at 125, in which case glass cover 123 should be made of suitable tempered glass of a strength sufficient to support an airplane passing thereover along the runway. Flange 122 provides a convenient support for the housing and may rest on any suitable supporting means such as a cradle of wood, cement or other material.

Within housing 120 there is mounted one, or preferably a plurality of gaseous discharge tubes. Where a pair of tubes are used they may be of contrasting colors such as a green tube 130 and a red tube 131. These tubes are shown as supported at their ends by clips 133 similar to clips 78 in Figs. 2 to 6. Clips 133 are shown as supported by blocks 134 of wood at each end of the housing, and additional support for the tubes may be provided by suitable wooden supporting strips 135 spaced within the housing and supported therein in any suitable way such as by means of screws 136 connecting the ends of the strips with the sides of the housing.

The wiring arrangement for the light unit shown in Figs. 9 to 12 is different from that in the other units since it is desirable to be able to energize selectively either of the tubes without the other. Accordingly, a double pole double throw electric switch 140 is provided, preferably within the control tower, which may be operated to close a circuit through either of tubes 130 and 131. It will also be understood that all such circuits along a single runway may be controlled simultaneously.

Referring to Figs. 13 through 15, a further type of unit is shown which is especially adapted for marking the ends of the runway or the end of the field, in order clearly to identify such positions to the pilots. As there shown the unit comprises a base 150 on which there is mounted an elongated tube support 151 having inclined opposite side faces 152 on which are mounted bolts 153 for supporting the tube brackets 154 which are mounted adjacent either end of the unit. Tubes 155 of the character described above are mounted in such clips at either side of the support.

A supporting assembly 157 is also provided at either end of the casing and is notched as shown at 158 to receive reflectors 159 therein. A sheet metal casing 160 having apertured side walls 162 and an open bottom is removably received over the base 150. The casing includes end walls 164 suitably secured as by welding the turned over flanges 163 of the side walls thereto. Clips 165 provide for detachably securing the housing in assembled position on the base.

The apertures in the side wall opposite the tubes 155 are enclosed by glass plates 166 which are held in position by flanges 167, the plates being suitably secured thereto with water-proofing material so that the entire assembly is weatherproof.

If desired the tubes on opposite sides of the unit may be of the same color or one may develop a red light and the other a green light. In the latter case the unit may advantageously be placed so that the green light appears to the pilot coming into the runway, and so that he will have a definite marker for the end of the runway and know that having passed such light the plane can be safely landed. At least one and preferably a plurality of such units are located in a line extending across the end of the runway. On leaving either end of the runway, only the red light would be observed and the pilot would thus be warned of the exact location where it was necessary to get the plane off the runway. With the construction shown it is not possible to see both lights at once and the pilot sees either a red or green depending upon whether he is leaving or approaching the runway.

It is found advantageous to provide for energizing such dual light source from a common transformer and with the two tubes in series relation with each other as indicated in the wiring diagram of Fig. 15. The primary of the transformer is indicated at 170 having taps for being energized from different primary voltages and also having a tap at a somewhat higher voltage for the connection of a condenser 171 which can be used to improve the power factor of the circuit. The secondary of the transformer is shown at 172, and may develop approximately 1600 volts to be applied to the two tubes in series for the energization thereof. While this voltage is available at the time of starting, the characteristics of the transformer are preferably such that when the tubes have once been placed in operation, with a current flowing therethrough, the secondary voltage will be suitably reduced to provide a desired current flow.

In the operation of the system shown herein, the operator in the control tower will select a particular runway on which it is desired to have the incoming plane land, as determined by prevailing wind conditions. Assuming such runway to be the northwest runway, i. e., runway 25 as shown in Fig. 1, the runway lights 26 identifying and marking the side boundaries of that runway will be energized by closing the circuits to these particular lights, thus producing marking lights along the side edges of the selected runway either in red or green as desired. At the same time the unit or units 150 across the approach end of the selected runway are also energized, showing green toward the incoming aircraft. Likewise the series of approach lights 27 associated with the selected runway are energized. The usual wind tetrahedron or direction indicator may also be outlined by a series of the elongated gaseous discharge tube lights of this invention and this also supplements the other landing equipment in showing the proper direction for landing.

Approach lights 27 extend well in advance of the actual runway, the distance in any installation being determined in some measure with relation to the glide angle and the minimum permissible ceiling conditions. Where for example the glide angle is 2½° it is advantageous to have such lights extend beyond the end of the runway for approximately 1500 to 2000 feet, or farther, to enable the pilot to identify such series of lights even under poor visibility conditions, well ahead of his actual arrival over the runway.

While the longitudinal spacing of the lighting units 27 may vary, it is preferred that they be arranged with a uniform spacing to better enable the pilot to orient his position, a suitable spacing being of the order of 50 to 100 feet. In this way the pilot is enabled to identify a series of such lights, and to be certain that they are landing field lights as distinguished from roadside stands, or other general purpose lights. Further, if desired, and particularly where the ground slopes sharply in advance of the runway, the lights may be mounted above the ground level and so as to present a substantially uniform appearance and depth when viewed from the approaching plane. The ability to view a number of such lights in a regular and uniform pattern is highly desirable as giving a line of position, a condition which is not obtainable where the pilot can see only one light at a time.

Referring to Fig. 17, the series of lights are indicated diagrammatically in reference to the glide path 180 and an arrangement is shown in which the angle of the unit relative to the ground level varies progressively so as to develop maximum visibility for the pilot. Thus the angle $a$ between the perpendicular 181 and the plane 182 of the surface of the unit 27 at the outer end of the series of approach lights may be relatively large, approaching 90 so that the maximum visibility will be available when the pilot looks downward. As the runway is approached, this angle becomes less and at the final position the angle may be reduced to 15° or even less so that the unit is substantially normal to the glide path.

As a pilot comes in on a glide path, he should be able to identify one or more of the lighting units before he drops below the minimum altitude level. Having identified the units because of their large size and distinguishing characteristics, as well as their close arrangement in a series, the pilot can then continue on the glide path even though full visibility of other land objects may be obscured. Even in the final landing operation and at the closest approach to the light sources there is no objectionable effect and the pilot can continue to look directly at the lights which at all times afford an accurate indication of the ground level without distortion or optical illusion, completing the landing in this way with reliability and confidence. The presence of the marker lights at the end and along the runway further indicates the final position in front of the administration building to which the ship is to be brought.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an airport lighting system, a series of light sources arranged in a single line for marking the glide path of a landing field in advance of the runway, each said source comprising a plurality of elongated gaseous discharge tubes of predetermined non-blinding intensity mounted in general parallel relation to each other to thereby afford a blanket light source of relatively large surface area, and elongated reflectors mounted around said tubes and substantially parallel to said glide path for distributing the light from said tubes in a wide angle transversely of said flight path to provide for visibility thereof from an aircraft approaching at a substantial angle to either side of the normal flight path, there being a plurality of other light sources arranged in a double line along said runway and having like characteristics substantially definite and readily distinguishable from said glide path light sources.

2. In an airport lighting system, a series of light sources arranged in a single line for marking the glide path of a landing field in advance of the runway, each said source comprising a plurality of elongated gaseous discharge tubes mounted in general parallel relation and adapted to be positioned in general alignment with the normal path of flight of an aircraft thereover in landing to thereby afford a blanket light source of relatively large surface area, and elongated trough-shaped reflectors mounted around said tubes and opening toward said normal path of flight for distributing the light from said tubes in a wide angle transversely of said flight path to provide for visibility of said light from an aircraft approaching at a substantial angle to either side of the normal flight path, the central ones of said plurality of tubes being mounted deeper in said reflectors than the outer ones thereof to thereby effect increased light intensity centrally of said angle.

3. An airport lighting system comprising, in combination, a plurality of light sources arranged in a single line extending beyond the outer end of a runway of the airport for a substantial distance to define a glide path, each of said light sources being in the form of a blanket of substantial area, and a plurality of other light sources arranged in a double line along said runway and having light characteristics substantially different and readily distinguishable from said glide path light sources.

4. An airport lighting system comprising, in combination, a plurality of light sources arranged in a single line extending beyond the outer end of a runway of the airport for a substantial distance to define a glide path, each of said light sources comprising a plurality of elongated gaseous discharge tubes arranged side by side forming a blanket of substantial area, and a plurality of gaseous discharge tubes of different color characteristics from said glide path light sources and arranged in a double line along said runway.

5. A landing field light comprising a base, a plurality of elongated gaseous discharge tubes supported on said base in a row and in substantially parallel relation to each other, a plurality of reflectors mounted on said base for reflecting light from said tubes outwardly away from said base, each of said reflectors being disposed between said base and a respective one of said tubes, said tubes and said reflectors being disposed on said base in position wherein when adjacent tubes are energized the light therefrom is directed from a substantially continuous area of said base and is of an intensity substantially equal to the light directed from said base when one of said tubes is energized, and means including a switch connected to said tubes for selectively controlling the energization of adjacent tubes progressively along said row to thereby vary the said area of light and thereby vary the quantity of light directed away from said base.

6. A landing field light comprising a box having one transparent side, a plurality of gaseous discharge tubes mounted in said box in a row in substantially parallel relation to each other, said tubes being of the character effective to carry discharge currents of more than .060 ampere and less than .500 ampere, and reflectors mounted in said box on the opposite side of said tubes from said transparent side for directing light from said tubes in a substantially continuous sheet outwardly through said transparent side, said reflectors being so disposed in said box that the intensity of the light directed outwardly through any unit area of said transparent side is substantially equal to the intensity of the light directed outwardly through any other equal unit area of said transparent side.

HAROLD A. CLINE.

REFERENCES CITED

The following references are of record in the file of this patent:

UNITED STATES PATENTS

| Number | Name | Date |
|---|---|---|
| 973,685 | Moore | Oct. 25, 1910 |
| 1,540,123 | Hartney | June 2, 1925 |
| 1,658,163 | Gatkowski | Feb. 7, 1928 |
| 1,706,091 | Wiegand | Mar. 19, 1929 |
| 1,858,755 | Van Wyck | May 17, 1932 |
| 1,860,685 | Morris | May 31, 1932 |
| 1,880,230 | Beck | Oct. 4, 1932 |
| 1,906,406 | Chromy | Apr. 25, 1933 |
| 1,998,429 | Andre et al. | Apr. 23, 1935 |
| 2,046,044 | Vissing | June 30, 1936 |
| 2,038,506 | Cadieux | Apr. 21, 1936 |
| 2,068,360 | Van Deventer | Jan. 19, 1937 |
| 2,155,295 | Bartow | Apr. 18, 1939 |
| 2,296,936 | Logan et al. | Sept. 29, 1942 |
| 2,438,453 | Powell | Mar. 23, 1948 |

FOREIGN PATENTS

| Number | Country | Date |
|---|---|---|
| 341,354 | Italy | June 22, 1936 |